Jan. 28, 1964
A. CHECKOVICH
3,119,752
RECOVERY OF FRESH WATER FROM SEA WATER
Filed Jan. 30, 1959
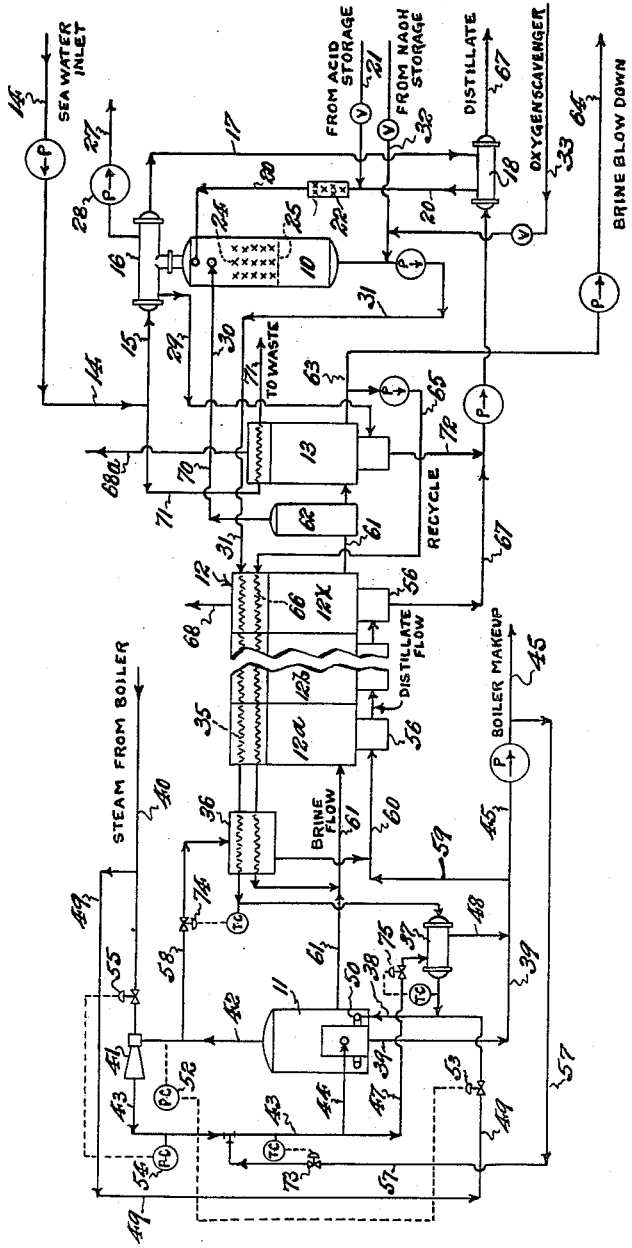
INVENTOR.
Andrew Checkovich,
BY
Frank M. Murphy
Attorneys United States Patent Office 3,119,752
Patented Jan. 28, 1964

3,119,752
RECOVERY OF FRESH WATER FROM SEA WATER
Andrew Checkovich, South Norwalk, Conn., assignor to Singmaster & Breyer, New York, N.Y., a partnership of New York
Filed Jan. 30, 1959, Ser. No. 790,290
7 Claims. (Cl. 202—57)

The present invention relates to the recovery of fresh or potable water from sea water or other water having characteristics similar to those of sea water. More particulraly, it relates to the conditioning of sea water for fresh water recovery and the recovery of fresh water by distillation or evaporation processes.

Conditioning sea water according to the invention can be used in combination with known evaporation processes and, similarly, the evaporation according to the invention can be used in combination with other conditioning processes. Preferably, however, the improvements according to the invention are used together.

The economy of a distillation fresh water recovery process depends to a considerable extent on how large a temperature differential can be obtained between the sea water temperature in the first or high temperature distillation stage and the temperature of the evaporation residue being discharged. Commonly, the temperature of the residue is limited by the temperature at which the sea water is available, so that the lower temperature involved in the differential cannot be changed conveniently. The temperature of the first stage is limited by the tendency of the water to scale, and the principal obstacle to economical distillation of sea water at the present time is scale deposition on the evaporator and heat exchanger heat transfer surfaces at elevated temperatures.

For untreated sea water, formation of calcium carbonate and magnesium hydroxide scale becomes a problem at evaporating temperature above 170° F., even for relatively low brine concentrations, while calcium sulfate scale occurs at temperatures and concentrations considerably in excess of those at which $CaCO_3$ and $Mg(OH)_2$ scales occur.

Numerous methods for circumventing the scaling problems created by sea water evaporation have been tried. Most of these methods are based on injection of chemicals into the sea water prior to its evaporation. The more effective chemicals include U.S. Navy boiler compound mixture, sulfuric acid, ferric chloride, and Hagevap. At the present time the upper temperature limit for sea water treated with these chemicals is approximately 190° F. The introduction of acid or acid compounds directly into the evaporating sea water in accordance with existing methods has the advantage of permitting operation at higher temperatures, but operation in this manner presents additional problems. These include increased corrosion rate of equipment and piping systems in contact with the acid treated sea water, vapor, and distillate and a decrease in the heat transfer rates due to the presence of carbon dioxide gas and other non-condensible gases.

It has also been proposed to introduce ferric ions into the sea water by electrolysis. This electrolysis method produces ferric ions by passage of an electric current from iron anodes to carbon cathodes using sea water brine as an electrolyte. Although satisfactory scale prevention is claimed for this method at 225° F. evaporating temperatures, this method is costly from both installation and operating standpoints. It also introduces iron sludge into the evaporating sea water which may interfere with heat transfer and give rise to other operating difficulties.

Treatment of sea water by conventional lime-soda or zeolite softening systems is in general uneconomical because of the high hardness content of the sea water.

The problem of scale formation has also been dealt with by provision of techniques for removing the scale. These methods include mechanical cleaning, chemical cleaning and scale cracking or thermal shocking. A system requiring frequent use of any of these methods for scale removal, however, has the obvious disadvantage of capacity loss due to downtime and lowering of the heat transfer rate and equipment capacity and capability as the scale builds up on the heat exchange surfaces. The scale cracking or thermal shock method of scale removal is more advantageous from time and labor standpoints when applicable because of equipment design and type of scale formed. This method is based on subjecting the equipment to sudden changes in temperature causing the scale to crack-off the metal surfaces due to unequal contraction and flexing of the metal. The composition of the scale has a bearing on the effectiveness of its removal by this method. A scale having a high percentage of calcium sulfate is considerably easier to remove by thermal shock than is a scale high in calcium carbonate or magnesium hydroxide content.

With respect to condtioning of sea water, a primary object of the present invention is provision of a method for distillation of seat water in which relative high temperatures can be employed without substantial scaling of heat transfer surfaces. The use of high temperatures without excessive scale formation permits recovery of fresh water at a cost significantly less than is otherwise possible, provided of course that the cost of inhibiting scale formation is not excessive. It is within the purview of the above-mentioned object therefore to provide for economically preventing excessive scale formation at relative high distillation temperatures.

A further object of the invention is a method for the conditioning of sea water adapted to provide treated water of low corrosiveness so that low cost materials of construction such as steel and iron can be employed for the construction of equipment in which the sea water, brine, vapor and distillate are handled.

Another object is to provide a method for the conditioning of sea water in which substantially all non-condensible gases and gas producing constituents are removed from the sea water. This will permit realization of improved heat transfer rates in the heating and evaporating equipment.

With respect to improvement in the evaporation of fresh water from sea water, the invention is particularly concerned with evaporation processes in which a portion of the evaporation residue is recycled, and a primary object of the invention is to provide an improvement in sea water distillation process where recycle is employed.

Broadly considered, the method of the invention provides for conditioning sea water or other water of similar composition for recovering fresh water or potable water therefrom, by admixing an acid with the sea water, and decarbonating the acid-sea water admixture by exposing (e.g. venting) the admixture to a gas pressure and at a temperature and for a time sufficient to liberate therefrom carbon dioxide derived from the carbonates present in the sea water and leave the cations of the carbonate salts dissolved in the sea water. As an incident of this treatment, substantially all carbon dioxide present in the admixture initially in the sea water and formed during the decarbonation is liberated from the water, and the decarbonated water is substantially free of carbon dioxide. Following the decarbonation, the decarbonated acid-sea water admixture is heated in evaporating equipment to evaporate fresh water therefrom, and it is characteristic of the method of the invention that the evaporation is carried out at elevated temperature corresponding to low rate of scale formation on the equipment.

The effect of the pre-treatment of the invention is to modify the sea water composition so that calcium carbonate and magnesium hydroxide scales do not form to an objectionable extent during evaporation, and the invention contemplates using for the evaporation operation temperatures corresponding to a tolerable rate of scale formation on evaporator equipment. Commonly, when evaporating water from sea water pre-treated according to the invention, the scale which limits evaporation temperature will be calcium sulfate scale.

The decarbonated acid-sea water admixture can be subjected to distillation involving evaporation of fresh water in a series of evaporation stages characterized in that the evaporation temperature in the first evaporation stage, i.e., the evaporation stage into which the treated admixture is initially introduced and initial evaporation occurs, is an elevated temperature but less than the temperature corresponding to excessive scale formation at the concentration of the first stage, and the evaporating temperature in each succeeding stage is less than the evaporating temperature of its next preceding stage and is less than the temperature corresponding to excessive scale formation. Thus, the recovery can involve subjecting the decarbonated admixture to successively lower distillation temperatures, the highest of the distillation temperatures being a relatively high temperature, the use of which without excessive scale formation, is made possible by the treatment involving removal of the carbon dioxide present as such or in combined form as carbonates in the sea water.

According to the invention, the decarbonation and evaporation are coordinated so that concentration of the sea water to the extent desired is effected in an economical manner. The temperature that can be employed for the evaporation without excessive scale formation due to calcium carbonate and magnesium hydroxide depends on the extent to which the carbonate salt concentration in the sea water is reduced in the decarbonation pre-treatment, and thus there is interdependence between the decarbonation and evaporation. In a preferred embodiment of the invention, the amount of acid admixed with the sea water is substantially chemically equivalent to the total alkalinity of the sea water, and the acid-sea water admixture is decarbonated to a total alkalinity of not more than about 10 p.p.m. Such treatment makes feasible the use of relatively high temperatures for the evaporation without excessive scaling, and hence permits more economical recovery of fresh water. By the method of the invention temperatures of up to 250° F. and even higher are practical, and commonly temperatures of about 225° F. and higher are in order.

The term "total alkalinity" in this specification means the methyl orange alkalinity. Thus, total alkalinity is equivalent calcium carbonate content in units of parts per million corresponding to the methyl orange end point as determined by titration with a standard acid. In sea water total alkalinity is due substantially entirely to the presence of carbonate and bicarbonate ion.

In addition to permitting the evaporation to be economically carried out at relatively high temperatures, and hence with high efficiency and less heat transfer surface, the method of the invention has the advantage that it can be conveniently operated so that corrosion is not excessive. Thus, in a preferred embodiment of the invention, following the decarbonation and before the evaporation, the decarbonated acid-sea water admixture can be treated to adjust the pH to above 7 and thereby increase the hydroxyl ion concentration so that corrosiveness of the admixture is minified. Advantageously, at the same time, there is added to the decarbonated admixture an oxygen scavenger to further reduce corrosiveness. Separately conducting the decarbonation and evaporation as is done in the method of the invention permits adjustment of pH in the manner described and thus greatly facilitates controlling corrosion in this manner.

Still another advantage of the pre-treatment of the invention is that during decarbonation the sea water is degassed so that heat transfer rates in the evaporation equipment are not reduced by degassing of the sea water during evaporation, and the heat transfer rates in condensing equipment are not interfered with by the presence of excessive amounts of inert gases.

Where in the evaporation process, a portion of the distillation residue is recycled, according to the invention, the treated sea water is passed through a series of evaporation stages including a first stage and at least one subsequent stage, and the recycle is introduced into one of the subsequent stages. In the stage in which the recycle is introduced, it is admixed with treated sea water residue fed to that stage from a preceding stage and the resulting admixture is subjected to distillation therein and in the following evaporation stages. This manner of operation has the advantage that it permits introduction of the recycle stream, which is a concentrated brine, at a location such that the utilization of high temperatures for initial evaporation of the pre-treated sea water is not interfered with. Thus, if the recycle were introduced with the pre-treated sea water into the initial evaporation stage, the initial temperature in this stage without excessive calcium sulfate scale formation would be relatively low whereas when the pre-treated sea water alone is introduced into the initial evaporation stage, a relatively high temperature can be employed in this stage without excessive calcium sulfate scale formation. Such operation is particularly advantageous where calcium sulfate scale is to be considered as it permits higher concentration for the brine discharged to waste, and this in turn permits reduction in chemical treating costs per unit of fresh water produced.

An analysis of an average sea water, which can be considered typical, is set forth in Table I, and there is also included in this table a corresponding analysis for sea water decarbonated according to the invention.

TABLE I

*Composition of an Average Sea Water and the Corresponding Treated Sea Water*

[All quantities except pH in parts per million, p.p.m.]

| | Column (a) Average Sea Water | Column (b) Treated Sea Water [1] |
|---|---|---|
| Calcium, Ca | 410 | 410 |
| Magnesium, Mg | 1,300 | 1,300 |
| Sodium, Na | 10,800 | 10,800 |
| Potassium, K | 390 | 390 |
| Chloride, Cl | 19,450 | 19,450 |
| Sulfate, $SO_4$ | 2,700 | 2,810 |
| Total Alkalinity | 115 | 5 |
| Range of Total Alkalinity | 90 to 150 | |
| Total Solids | 35,165 | 35,165 |
| Dissolved Gases | Varies | <1 |
| Dissolved Oxygen | Varies | Trace |
| Free $CO_2$ | Varies | Trace |
| pH Value | 7.9 to 8.2 | 7.0 to 8.0 |

[1] Treatment includes addition of approximately 110 p.p.m. of $H_2SO_4$ to the average sea water (i.e. water having a total alkalinity of 115) and about 2–3 p.p.m. of NaOH to the degsed effluent.

The formation of calcium carbonate and magnesium hydroxide scale of untreated sea water is a function of pH, temperature, calcium and magnesium concentration, and total alkalinity. With increasing temperature, conversion of bicarbonate ($HCO_3^-$) ions to carbonate ($CO_3^=$) ions takes place according to reaction (a) shown below. As more heat is applied and temperature increases, the carbonate ions tend to decompose to form $CO_2$ gas and ($OH^-$) ions according to reaction (b), and a rise in the pH value occurs as $CO_2$ gas leaves the system and ($OH^-$) ions are formed. The scale forming reactions are indicated by reactions (c) and (d) respectively.

(a) $2HCO_3^- + heat \rightarrow H_2O + CO_2 \text{ gas} + CO_3^=$
(b) $CO_3^= + H_2O + heat \rightarrow CO_2 \text{ gas} + 2OH^-$
(c) $Ca^{++} + CO_3^= \rightarrow CaCO_3$ scale
(d) $Mg^{++} + 2OH^- \rightarrow Mg(OH)_2$ scale The type and amount of scale formed from raw sea water for a given set of operating conditions is a function of relative solubilities of $CaCO_3$ and $Mg(OH)_2$ and the concentration of the respective ions involved.

It is to be expected from the above reaction that scale formed from untreated sea water at relatively low operating temperatures will be mostly calcium carbonate with a greater percentage of $Mg(OH)_2$ forming as the temperature of operation is increased. This is borne out by tests and operating experience, which show that, at evaporating temperatures up to about 180° F. the scale formed is predominately $CaCO_3$, while at evaporating temperatures above 190° F. the scale is predominately $Mg(OH)_2$.

Examination of reactions (a) to (d) above indicates that the removal of carbonates, i.e. reduction of total alkalinity, from the sea water would tend to prevent calcium carbonate scale forming on sea water distillation equipment. From reaction (b) is will also be noted that a rise in the pH value or ($OH^-$) ion concentration occurs due to the break-up of ($CO_3^=$) ions as the temperature of raw sea water is increased. Hence, removal of substantially all total alkalinity will permit accurate control of the pH value or hydroxyl ion concentration of the evaporating brine to eliminate $Mg(OH)_2$ scale formations.

The method proposed for removal of carbonates from sea water is to feed sufficient acid such as HCl or $H_2SO_4$ to the sea water to convert carbonate ions ($CO_3^=$) into bicarbonate ions and bicarbonate ions into carbonic acid or $CO_2$ gas. Assuming sulfuric acid is used as the treating chemical because of its lower cost and facility of handling, the reactions taking place may be expressed as follows:

(e) $2CO_3^= + H_2SO_4 \rightarrow SO_4^= + 2HCO_3^-$
(f) $2HCO_3^- + H_2SO_4 \rightarrow SO_4^= + H_2CO_3$
(g) $H_2CO_3 \rightarrow H_2O + CO_2$ gas The carbonic acid ($H_2CO_3$) decomposes into water and carbon dioxide in accordance with reaction (g) and substantially all carbon dioxide present in the acid-sea water admixture is removed during the decarbonation.

In the method of the invention the decarbonation is advantageously effected by subjecting the acid-sea water admixture to adequate venting at the saturation temperature corresponding to the pressure under which the decarbonation process is conducted, employing degasifying or deaerating equipment that assures adequate mixing of the admixture with surrounding vapor and provides for sufficient lowering of the partial pressure of the $CO_2$ gas in contact with the treated admixture to assure its reduction in the admixture to the desired value. The decarbonation or degasifying process can be performed at low pressures corresponding to a saturation temperature of slightly below that of the incoming sea water or at higher pressures up to atmospheric, or even higher, by supplying sufficient heat to the admixture. Subatmospheric pressures corresponding to saturation temperatures above about 80° F. are preferred for this degasification process, the optimum operation pressure being dependent on the type of distillation process and equipment being employed. Usually, the degasification temperature will be in the range of about 80–160° F.

Removal of the carbon dioxide from the acid-sea water admixture can also be performed by aeration in more or less conventional aerating equipment. The decarbonation by venting the admixture while at its saturation pressure is, however, preferred because it also removes oxygen and other non-condensible gases.

A feature of the decarbonation according to the invention is that this treatment is such that salts present in the admixture including salts formed during the treatment remain soluble therein. The pre-treatment of the invention does not involve removal of the calcium or magnesium cations and little or no scaling or precipitation occurs during the decarbonation.

As indicated hereinbefore, the extent to which it is desirable to carry the decarbonation will depend on the manner in which the evaporation is carried out. In general, in the method of the invention, the decarbonation will be carried to the extent that total alkalinity of the decarbonated admixture is less than about 30 p.p.m. Advantageously, the decarbonation is carried to the point of substantially complete removal of carbon dioxide present initially in the admixture as carbonates in the sea water. Thus, the decarbonation is advantageously carried to the point where total alkalinity in the decarbonated admixture is less than about 10 p.p.m. In general, this total alkalinity corresponds with evaporation temperatures of above about 235° F. If desired, even lower total alkalinities can be attained, e.g. 5 p.p.m. or even lower, and, as indicated hereinbefore, total alkalinities in excess of about 15 p.p.m. can be employed provided the evaporation temperature (i.e. the highest temperature employed during the evaporation) and the extent of concentration are restricted accordingly.

As an incident of decarbonation, carbon dioxide concentration as such is greatly reduced, and, as is indicated in Table I can be reduced to a trace. Thus, the decarbonation can reduce the carbon dioxide concentration to about 2 p.p.m. and it can be further reduced to a trace (e.g. less than 0.5 p.p.m.) by treating the decarbonated admixture with about 2–3 p.p.m. of sodium hydroxide, the use of which is recommended to reduce the hydrogen ion concentration and therefore the corrosiveness of the decarbonated admixture.

The acid employed to liberate the carbon dioxide is not critical. Inorganic acids or acid compounds such as hydrochloric acid and sulfuric acid or an acid salt such as sodium bisulfate are suitable. In the specification and the claims, the term "acid" is employed in reference to all acids and acid materials effective to liberate carbonates from the sea water. Organic acids which would decompose during evaporation or contaminate the fresh water product are undesirable. The acid employed should be compatible with the composition of the sea water so as to provide for the decarbonation in the intended manner, i.e. removal of carbon dioxide without insolubilizing material in the admixture.

The amount of acid employed depends of course on the extent of the decarbonation and should be about the chemical equivalent of the total alkalinity reduction required. Where substantially complete decarbonation is required, the amount of acid should be an amount substantially chemically equivalent to the total alkalinity of the sea water. Thus, for a sea water having a total alkalinity of 115 p.p.m., the amount of acid should be the chemical equivalent of about 105 to 115 p.p.m. total alkalinity, and similarly for a total alkalinity of 90, acid should be the chemical equivalent of about 80 to 90 p.p.m. of total alkalinity. In terms of pH, in general, for a total alkalinity of about 0–30 p.p.m. of the decarbonated acid-sea water admixture, the pH of the acid-sea water admixture before decarbonation should be about 4.3 to 6.0, and for a total alkalinity of about 7–15 p.p.m. of the decarbonated acid-sea water admixture, about 4.6–5.5.

Advantageously the decarbonated admixture is treated to adjust the pH thereof to 7–8.2 by neutralizing with a basic material and thereby the corrosiveness of the decarbonated admixture is reduced. Depending on the decarbonation treating conditions, the pH of the decarbonated sea water can be less than 7 and raising the pH is desirable to preclude occurrence of corrosion. Where the decarbonation is carried to the extent of reducing total alkalinity to 30 p.p.m., the pH of the decarbonated admixture may be above 7 so that little or no addition of alkaline material is required. When pH of the decarbonated admixture is adjusted, the extent to which it can be raised depends upon the occurrence of magnesium hydroxide scale and hence a pH of 8.2 will in some cases be too high. Preferably a non-carbonate alkaline medium such as sodium hydroxide can be used to raise the pH.

It is also advantageous to add to the decarbonated sea water an oxygen scavenger to remove the last traces of oxygen and reduce the corrosiveness of the water. Sodium sulfite can be used for this purpose. Reduction of the free $CO_2$ in the degased effluent to about 2 p.p.m. will normally decrease the dissolved oxygen to less than 0.1 p.p.m. and the addition of approximately one p.p.m. of $Na_2SO_3$ will reduce the dissolved oxygen to substantially zero.

Production of fresh water from sea water treated in accordance with this invention can be accomplished in any of the well known distillation processes such as vapor compression, multiple effect evaporation, and multi-stage flash evaporation or any combination of these processes. The preferred initial evaporation temperature is above about 225° F., and for multiple stage or effect evaporation, the evaporating temperature of each subsequent effect is less than that of its next preceding effect. Using multistage evaporation, in general, the sea water conditioned according to the invention can be concentrated up to about two or even greater concentrations before discharging the distillation residue or brine to waste and excessive scaling does not occur so that the evaporation is economical.

The number of concentrations effected by the evaporation is the number of times that the concentration of dissolved materials in the sea water is increased due to evaporation therefrom of fresh water during the evaporation treatment.

Exceptional fuel economy is possible when using sea water treated in accordance with this invention with vapor compression distillation combined with multi-flash distillation. However, where low cost, low pressure steam is available, multi-stage flash distillation may prove more economical when operated with treated sea water and with distillation residue recycled in accordance with this invention.

Where a portion of the evaporation residue is recycled and the evaporation operation includes flash evaporation which follows the first evaporation stage or stages, the treated sea water and the recycle are advantageously preheated prior to subjecting them to final heating and evaporation treatment by separately passing them through the condensing coils of at least one of the flash evaporators for use as a cooling medium to condense the evaporator vapor.

The conditions for the evaporation will in some cases depend upon precipitation of calcium sulfate. The solubility of calcium sulfate in sea water for a given temperature is a function of the calcium ion and sulfate ion concentration. Because of the mass ion effect its solubility is greater in sea water than in a water containing substantially no other salt.

Information on the precipitation of calcium sulfate is reported in the literature. Evaporation tests on sea water conducted at 212° F. indicated that calcium sulfate precipitates in two physical forms: hemihydrate, $CaSO_4 \cdot \tfrac{1}{2}H_2O$ and anhydrite, $CaSO_4$. The hemihydrate did not precipitate until a concentration factor of 3.1 was reached, while the anhydrite reached its saturation point at 1.5 concentration factor. However, the incubation period for anhydrite is over 100 hours and precipitation of anhydrite is unlikely in a distillation process according to the invention before the concentrated brine is discharged to waste.

Although calcium sulfate, in both the anhydrite and hemihydrate form decreases in solubility as temperature is increased, little or no precipitation will take place in a distillation process at temperatures up to about 250° F., providing the concentration factor is maintained at a suitably low value. In accordance with the invention, multiple stage distillation can be employed and by progressively removing additional distillate at correspondingly lower temperatures in succeeding effects, an effort can be made to maintain a suitably high overall concentration factor by employing an initial flash or boiling temperature of 230° F. to 250° F. in the first stage without undue calcium sulfate scale formation. Relatively high sulfate and or calcium concentrations in the raw and treated water will require correspondingly lower initial flash or boiling temperature and or concentration for control of calcium sulfate scale formation. Where the calcium and sulfate concentrations are appreciably lower than in the average sea water the initial flash or boiling temperature can be raised above 250° F. without any undue scaling by water treated in accordance with this invention. For an average sea water treated in accordance with the invention, at a concentration of 1.2 in the first stage, the boiling temperature should be limited to about 230° F. to assure no undue calcium sulfate scale.

A flow sheet for an embodiment of the method of the invention is set forth in the accompanying drawing. In this embodiment the sea water is pre-treated according to the invention, and the evaporation treatment involves vapor compression distillation in combination with multiflash distillation and a portion of the evaporation residue is recycled to the evaporation operation.

Referring to the drawing, the plant there depicted includes a vacuum degasifier 10 and an evaporation system including first stage evaporator 11, a plurality of flash evaporators 12 including flash evaporators 12a, 12b and 12x, and final evaporation stage 13.

Sea water or water of similar characteristics, e.g. water having a total alkalinity of not more than about 200–250 p.p.m. and a total solids content of about 4000 p.p.m. or more, enters the plant through line 14, passes through line 15, into shell and tube vent condenser 16, and then via line 17 to indirect heat exchanger 18. From the heat exchanger 18 the sea water flows through line 20 to the vacuum degasifier 10.

As the sea water flows through line 20, acid is added thereto from valved line 21, and intimate mixing of the acid and sea water is effected by acid mixer 22. The addition of acid is accurately controlled to provide the desired alkalinity reduction by means known in the art.

The vacuum degasifier 10 is provided with baffles or other suitable means of dispersing the acid-sea water admixture such as Raschig ring packing 24 and a perforated plate 25 arranged at a suitable level so as to provide reservoir space in the bottom of the degasifier. In the degasifier, the acid-sea water admixture is dispersed, carbonates decompose and carbon dioxide and non condensible gases are evolved. The required pressure is maintained in the degasifier by venting the unit through line 27 which is provided with vacuum pump 28 and is connected to the vent condenser 16. Water vapor condensed in the vent condenser, by sea water introduced through line 15, drains from the condenser via line 29.

Heat in the form of steam required for the degasification is introduced into the degasifier via line 30.

The decarbonated admixture leaves the degasifier via line 31 and passes in this line to coils 35 of flash evaporators 12. In the course of passage to the flash evaporators, sodium hydroxide from line 32 is added thereto and an oxygen scavenger from line 33, e.g. sodium sulfite, is also added. Automatic control (not shown) is preferably employed to control the addition of these materials.

In the flash evaporators, the decarbonated admixture flows through coils 35 and is preheated while serving as a condensing media for the flash evaporators. It is further preheated in indirect heat exchanges 36 and 37, and then flows into the first stage evaporator 11 via line 38.

Steam for the evaporation is provided by a boiler (not shown). The steam enters the plant via line 40, and passes through jet compressor 41 which is connected by line 42 with first stage evaporator 11 to draw steam therefrom and compress it to the compressor discharge pressure prevailing in line 43. Steam from the compressor passes via lines 43 and 44 to the first stage evaporator steam chest and condensate from the steam chest flows via line 39 into condensate line 45 and 59.

A feature of the method of the invention is introducing the decarbonated admixture into the first stage evaporator 11 as a flashing mixture or a two phase mixture of water and steam. Operation in this manner provides agitation in the evaporator which results in improved heat transfer. Heat for causing the decarbonated admixture to flash can be provided by the heat exchanger 37 which is connected to receive steam, via line 43 and 47, from the steam jet compressor 41. The temperature of the water leaving heated exchanger 37 is controlled by temperature control valve 75. Condensate from the heat exchanger 37 passes via line 48 to line 39. Alternatively, or in addition, to providing the heat by heat exchanger 37, heat can be provided by injection of steam into the decarbonated admixture as it enters the evaporator. Thus, as is shown in the drawing, boiler steam is drawn from line 40 through line 49 and is injected into the decarbonated admixture flowing to the evaporator via line 38. To further increase agitation in the evaporator a distributor 50 is installed therein to evenly distribute the feed.

Certain of the controls for the first stage evaporator are depicted in the drawing. The temperature of the first stage evaporator 11 is controlled by a pressure controller including sensing unit 52 which is connected to sense pressure in line 42 and to control valve 53 which is mounted in steam line 49. The discharge pressure of the jet compressor 41 is controlled by a pressure controller including sensing unit 54 and regulating spindle 55, mounted, respectively, on the downstream side and upstream side of the ejector 41.

The control of steam pressure by sensing unit 52 and control valve 53 in the manner shown is highly advantageous when vapor compression is employed with a submerged surface evaporator as it results in stable operation of the vapor compression distillation because it compensates for pressure changes due to minor variations in heat transfer rates. Preferably, the preheating is carried out so that the evaporator feed is a flashing mixture as this results in more sensitive control.

Water for desuperheating the compressor discharge steam in line 43, is provided by connecting condensate line 45 to steam line 43 by line 57 and is controlled by temperature control valve 73.

Heating medium for heat exchanger 36 is steam drawn from evaporator steam discharge line 42, through line 58, and condensate from the heat exchanger passes into line 69. The required steam flow to heat exchanger 36 to maintain desired temperature is controlled by temperature control valve 74.

Brine from the first stage evaporator 11 flows via line 61 to flash evaporators 12, flash drum 62, final flash evaporator 13 and the distillation residue leaves the final evaporator 13 via line 63. The distillation residue is divided into two streams, brine blow down which leaves the plant via line 64 and residue recycle which flows in line 65.

The flash evaporators 12 are provided with coils 35 through which decarbonated admixture is passed and coils 66 through which recycle is passed. The coils are the cooling or condensing coils for the flash evaporators, the recycle and decarbonated admixture being heated and in turn condensing water vapor evolved from brine passed through the flash evaporators. The condensate of the flash evaporators collects in wells 56 and together with condensate from the first evaporator stage from line 60 passes into line 67 which is the distillate or fresh water product line. The flash evaporators are vented by line 68 which can be connected to vacuum pump 28 or other suitable vacuum equipment.

A feature of the invention is separately passing the recycle and decarbonated admixture through the coils of flash evaporators 12, and then passing the decarbonated admixture to the first or high temperature evaporation stage, and introducing the preheated recycle into a flash evaporator stage best suited to receive the recycle with consideration to overall optimum performance of the evaporation system having regard particularly for temperature levels and concentration of solids. While in the plant shown in the drawing the recycle is introduced into the first of the flash evaporator stages, in some cases it will be preferable to introduce it into a later stage of the flash evaporators.

The flash drum 62 which is interposed between the flash evaporators 12 and final flash evaporator 13 is connected by line 70 to vacuum degasifier 10 and provides heat in the form of steam to aid the decarbonation.

The operation of final flash evaporator 13 is in general the same as that of flash evaporators 12 except that sea water carried by line 71 is employed as the condensing medium. Condensate from the evaporator flows through line 72 to distillate line 67, and the evaporator is vented by line 68a which can be connected to suitable vacuum equipment.

The invention will be further described by means of the following example of operation for the plant depicted in the drawing.

EXAMPLE 150,000 pounds per hour of sea water of composition approximating that set forth in Table I for an average sea water and at 60° F. are decarbonated according to the invention and then subjected to evaporation to provide 73,700 pounds per hour of fresh water as distillate and and 76,300 pounds per hour of residue as brine blow down. The concentration factor is about 2.

For the decarbonation, the sea water is preheated to about 80° F. in the vent condenser and preheater, and about 110 p.p.m. of acid are added. With the aid of about 2300 pounds per hour of steam and the vacuum pump 28 the vacuum degasifier is operated at about 85° F. and saturation pressure. To degasifier effluent at 85° F. there is added about 2–3 p.p.m. of sodium hydroxide to increase hydroxide ion concentration and about 1 p.p.m. of sodium sulfite to react with traces of oxygen.

The decarbonated admixture is preheated to about 202° F. in the flash evaporators, is heated to about 218° F. in an indirect heat exchanger with steam formed in the first or high temperature evaporation stage and is then heated to about 228° F. by indirect heat exchange with steam at conditions of that employed as heating medium of the first or high temperature evaporation stage. The decarbonated admixture at 228° F. is then further heated by direct injection of about 300 pounds per hour of boiler steam to about 230° F., and the admixture at 230° F. is released into the first evaporator stage which is operated at 225° F. The admixture flashes as it enters the evaporator and this aids in providing good heat transfer rates.

Steam in amount of 6700 pounds per hours is provided at 600 p.s.i.g. and 600° F. by a boiler. This steam is the motive steam for a jet compressor which withdraws 20,000 pounds per hour of steam from the first stage evaporator. The discharge from the compressor amounts to 26,700 pounds per hour at 295° F. After addition of about 800 pounds per hour of water to remove superheat to about 235° F., the compressor effluent, after withdrawal of a small amount to preheat the decarbonated admixture from 218 to 228° F., is introduced into steam chest or coils of the first evaporator stage. In addition to the 20,000 pounds per hour of steam withdrawn by the jet compressor, about 6700 pounds per hour of steam is formed in the evaporator and this 6700 pounds per hour is employed to heat the decarbonated admixture and recycle brine from 202° F. to 218° F.

Brine in the amount of about 124,000 pounds per hour is withdrawn at 225° F. from the first stage wherein the concentration factor is about 1.2, and to this material there is added a recycle stream of about 260,000 pounds per hour of the evaporation system residue. The recycle stream, preheated to 218° F., is admixed with the brine from the first stage and the resulting mixture is passed through 9 flash evaporators connected in series and vented to the vacuum degasifier and having brine temperatures decreasing stepwise from 207° F. to 103° F.

The brine from the flash evaporators flows through a flash drum operated at about 96° F. and vented to the vacuum degasifier, to which it provides about 2300 pounds per hour of steam through the vent, and then through a final flash evaporator operated at about 85° F. and from which is withdrawn the evaporation residue. About 450 g.p.m. of sea water at 60° F. are used as cooling medium for the final flash evaporator.

As stated above, the residue from the evaporation is divided into a blow down stream and a recycle stream. The recycle stream is employed as condensing medium, and hence is preheated in the flash evaporators preceding the final flash evaporator. It is passed through these flash evaporators separately from the decarbonated admixture which is also employed as condensing medium and preheated. Upon leaving the flash evaporators the recycle is at about 202° F., and is then further heated to 218° F. with steam in an indirect heat exchanger. The steam for the heating is that evolved in the first or high temperature evaporation stage. As described above, the recycle at 218° F. is passed to the first stage of the flash evaporators.

While a particular embodiment of the invention is described in the flow sheet and the foregoing example, it will of course be understood that the scope of the invention is that of the appended claims.

*Materials of Construction*

An advantage of the improvements of the invention is that they permit the use of relatively low cost materials of construction. Thus, referring to the drawing, the vacuum degasifier 10, the shell of vent condenser 16, the acid mixer 22 and the piping from the acid mixer to the degasifier can be constructed of rubber lined steel or other suitable non-corrosive material while the tubes and tube sheets of the vent condenser 16 can be made of copper alloy resistant to distillate containing oxygen and dissolved carbon dioxide. The evaporator equipment can be iron or steel. The heat transfer surfaces can also be of iron or steel although it may be desirable to make them of copper alloy or other material having superior heat transfer coefficients.

What is claimed is:

1. A method of recovering fresh water from sea water containing salts tending to cause scale formation at elevated temperatures above 170° F. which comprises, treating the sea water by mixing an amount of non-precipitate forming acid with said sea water sufficient to reduce substantially its total amount of alkalinity expressed as equivalent calcium carbonate content to an amount ranging up to about 30 p.p.m. wherein dissolved $CO_2$ is formed by chemical reaction as determined by titration with a standard acid to a methyl orange end-point at substantially ambient conditions prior to removal of $CO_2$, then removing substantially the $CO_2$ formed, whereby to inhibit the scale-forming tendency and the corrosive action of said treated sea water at elevated distillation temperatures ranging up to about 225° F. and higher, and subjecting said treated sea water to distillation.

2. The method of claim 1, wherein the dissolved $CO_2$ is removed to below about 10 p.p.m.

3. The method of claim 1, wherein following the removal of $CO_2$ and before evaporation, the pH of the sea water is adjusted to from about 7 to about 8.2.

4. The method of claim 3, wherein oxygen in the treated sea water is removed by means of an oxygen scavenger.

5. The method of claim 1, wherein the acid added to the sea water is selected from the group consisting of $H_2SO_4$ and HCl.

6. A method of recovering fresh water from sea water containing salts tending to cause scale formation at elevated evaporation temperatures above about 170° F., which comprises, treating the sea water by mixing an amount of a non-precipitate forming acid with said sea water sufficient to reduce its total alkalinity expressed as equivalent calcium carbonate content to an amount ranging up to about 30 p.p.m. wherein dissolved $CO_2$ is formed by chemical reaction as determined by titration with a standard acid to a methyl orange end-point at substantially ambient conditions prior to removal of $CO_2$, then removing substantially the $CO_2$ formed, whereby to inhibit the scale-forming tendency and the corrosive action of said treated sea water at elevated distillation temperatures ranging up to about 225° F. and higher, subjecting said treated sea water to an evaporation treatment in which said sea water is passed through a series of evaporation stages to evaporate fresh water therefrom and form a concentrated brine as residue, said evaporation stages including a first stage and at least one subsequent stage, wherein the treated water entering said first stage is capable of being heated to at least about 225° F., with the evaporation temperature in each succeeding stage so correlated that it is less than the evaporation temperature of its next preceding stage, the evaporation temperature at each succeeding stage being inversely related to the brine concentration at each stage, and recovering water evaporated in the evaporation stages, whereby a high distillation rate of fresh water is effected at high temperature.

7. A method of recovering fresh water from sea water containing salts tending to cause scale formation at elevated temperatures above 170° F., which comprises, treating the sea water by mixing an amount of a non-precipitate forming acid with said sea water sufficient to reduce substantially its total alkalinity expressed as equivalent calcium carbonate content to a value ranging up to about 30 p.p.m. wherein dissolved $CO_2$ is formed by chemical reaction as determined by titration with a standard acid to a methyl orange end-point at substantially ambient conditions prior to removal of $CO_2$, then removing substantially the $CO_2$ formed, whereby to inhibit the scale-forming tendency and the corrosive action of said treated sea water at elevated distillation temperatures, subjecting said treated water to an evaporation treatment to form fresh water as a distillate and concentrated brine as residue by passing said water through a series of evaporation stages comprising a first stage and at least one subsequent stage serially connected to said first stage operating at a temperature lower than said first stage, recovering fresh water from each of the evaporation stages, discharging a portion of brine residue emanating from a subsequent stage of the evaporator to control brine concentration in the evaporator, and recycling a portion of the brine residue to any stage other than the first stage.

References Cited in the file of this patent

UNITED STATES PATENTS

| | | |
|---|---|---|
| 2,441,361 | Kirgan | May 11, 1948 |
| 2,537,259 | Cleaver et al. | Jan. 9, 1951 |
| 2,733,196 | Hillier et al. | Jan. 31, 1956 |
| 2,756,035 | Axelrad et al. | July 24, 1956 |
| 2,756,208 | Axelrad et al. | July 24, 1956 |
| 2,759,882 | Worthen et al. | Aug. 21, 1956 |
| 2,921,004 | Wood | Jan. 12, 1960 |

FOREIGN PATENTS

| | | |
|---|---|---|
| 158,595 | Australia | Sept. 2, 1954 |

OTHER REFERENCES

University of Michigan Dept. of Engineering Research Bulletins, 1930, No. 15, Formation and Properties of Boiler Scale, E. P. Partridge, pp. 91–103.

Chemical Engineering, October 1956, page 126, McGraw-Hill, New York, N.Y.

Betz Handbook, "Industrial Water Conditioning," pub. Betz Lab. Inc. (Phila., Pa.) 5th ed., 1957 (chap. 19, pages 66–69 relied upon.)